Dec. 22, 1942.                C. W. SINCLAIR                2,306,190
                                  BRAKE
                         Filed July 11, 1940           3 Sheets-Sheet 2
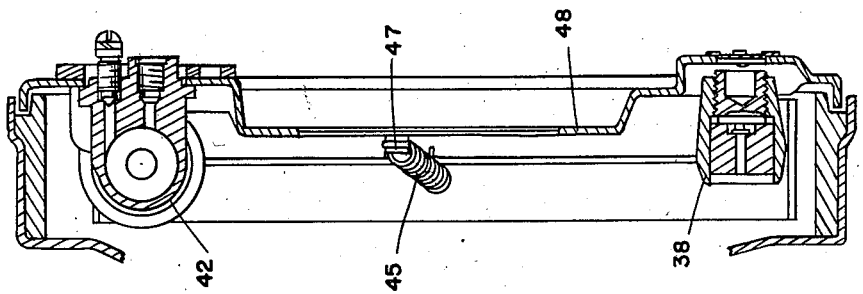
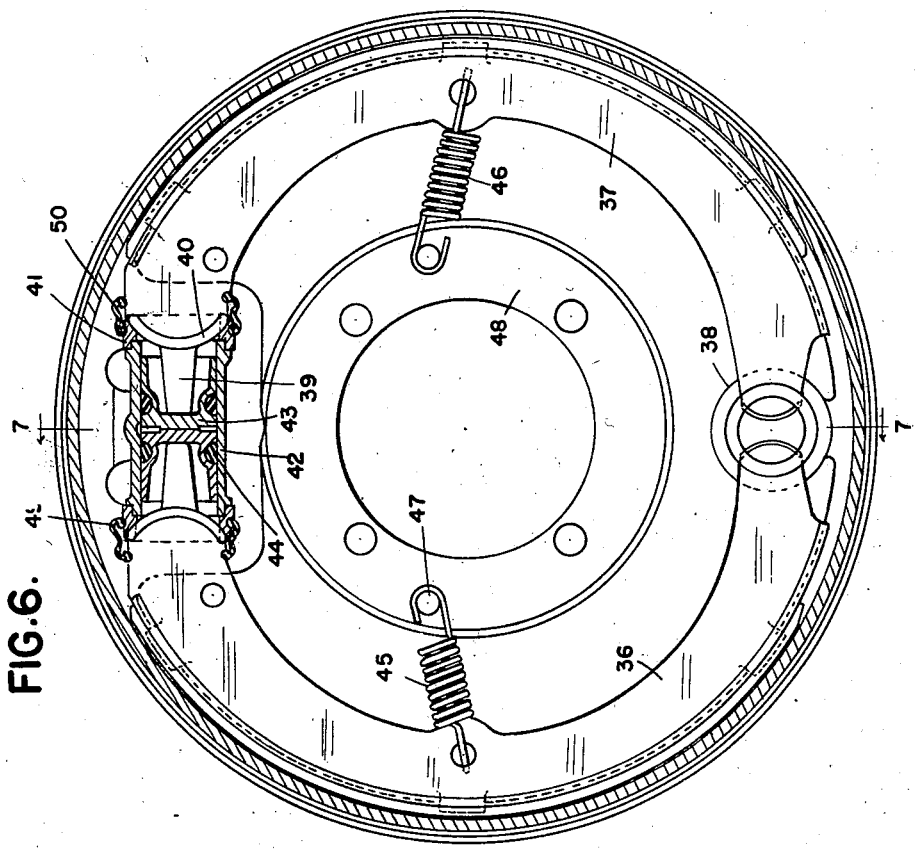
INVENTOR.
CHARLES W. SINCLAIR
BY
ATTORNEYS Dec. 22, 1942.   C. W. SINCLAIR   2,306,190
BRAKE
Filed July 11, 1940   3 Sheets-Sheet 3

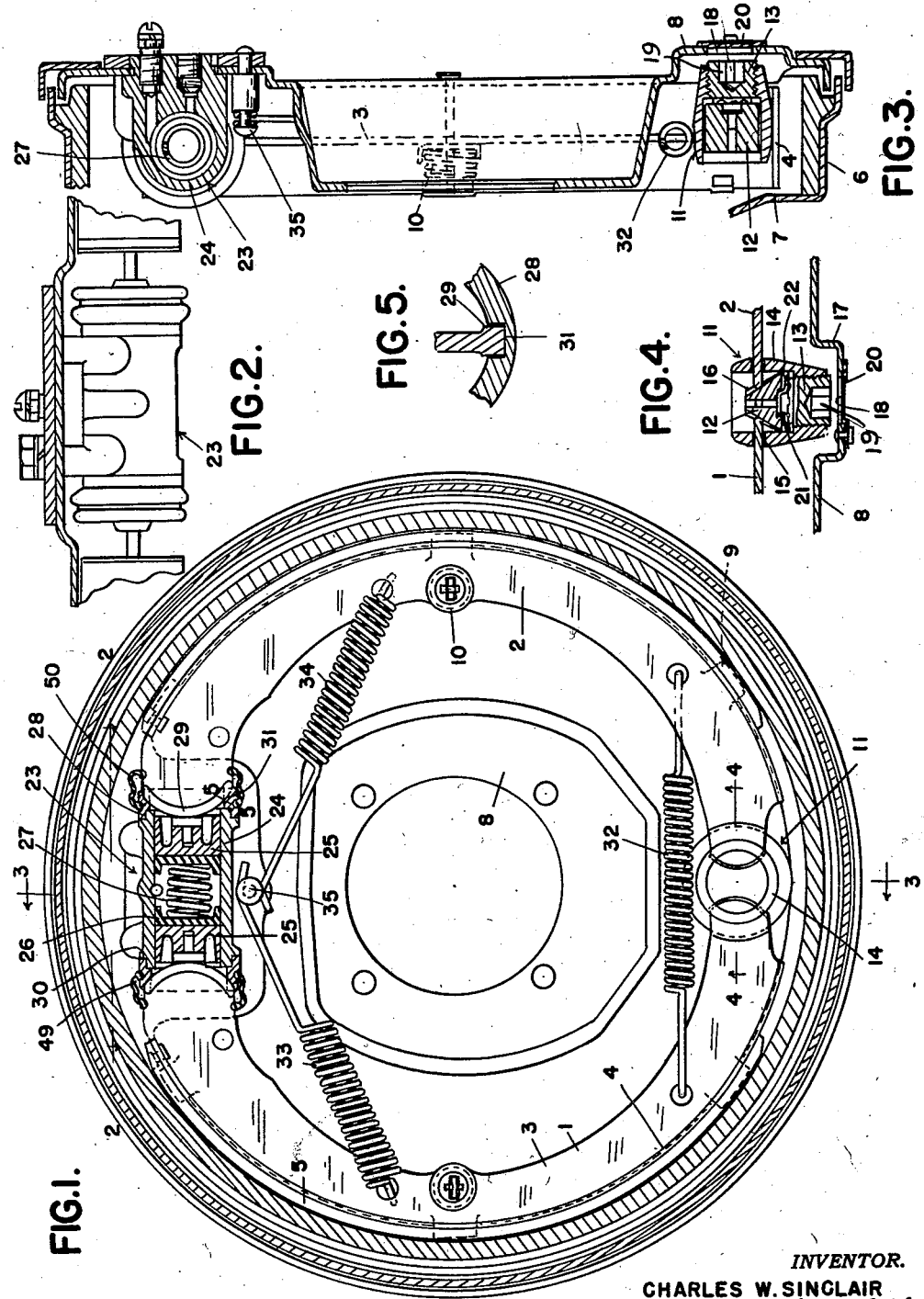

INVENTOR.
CHARLES W. SINCLAIR
BY
ATTORNEYS

Patented Dec. 22, 1942

2,306,190

UNITED STATES PATENT OFFICE 2,306,190

BRAKE

Charles W. Sinclair, Detroit, Mich., assignor to Kelsey-Hayes Wheel Company, Detroit, Mich., a corporation of Delaware Application July 11, 1940, Serial No. 344,971

11 Claims. (Cl. 188—152)

The invention relates to brakes and refers more particularly to motor vehicle wheel brakes.

The invention has for an object to provide a brake which is quiet in operation.

The invention has for another object to provide in a brake of that type having floating brake friction means arranged to anchor differently in opposite directions of rotation of the member to be braked, means for resiliently urging the brake friction means in a generally radially outward direction toward the anchoring means and for normally holding the brake friction means against the anchoring means during the initial actuation of the brake friction means.

The invention has for further objects to provide a simple spring arrangement for retracting the brake friction means and for normally holding the same against the anchoring means; to provide improved anchoring means and brake friction means to avoid deforming either; and to provide an improved construction of actuator engageable with and adapted to limit movement of the brake friction means.

These and other objects of the invention will become apparent from the following description, taken in connection with the accompanying drawings, in which Figure 1 is a sectional elevation illustrating a brake embodying my invention;

Figures 2, 3, 4 and 5 are cross sections on the lines 2—2, 3—3, 4—4 and 5—5, respectively, of Figure 1;

Figure 6 is a view similar to Figure 1 showing another embodiment of my invention;

Figure 7 is a cross section on the line 7—7 of Figure 6;

Figure 9:
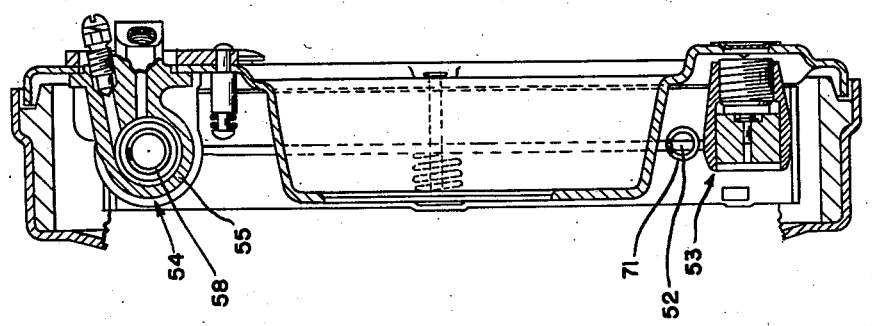
Figure 9 is a cross section on the line 9—9 of Figure 8.

As illustrated in Figures 1 to 5 inclusive, the brake friction means comprises the brake shoes 1 and 2, the upper and lower ends of which are separated. Each brake shoe is of T-section and has the radially extending web 3 and the axially extending flange 4, the latter having secured to its outer face the brake lining 5. The brake linings are engageable with the brake flange 6 of the brake drum 7 which may be of usual construction and is secured to a motor vehicle wheel. 8 is the backing plate which is secured to either the rear axle housing or the steering spindle of the motor vehicle. As shown, the backing plate is formed with the lands 9 which are engaged by the adjacent edges of the axial flanges 4 of the brake shoes. In the present instance, the brake shoes are held against the lands by the spring devices 10 which engage the webs of the brake shoes substantially midway between their ends. The spring devices provide for movement of the brake shoes relative to the backing plate and are of suitable construction.

The lower ends of the brake shoes are suitably operatively connected to each other through the adjustment device 11 which is a unit having its axis extending transversely of the backing plate 8 and the webs 3 of the brake shoes. The adjustment device comprises the wedge 12, the screw 13 and the bracket 14 which houses the wedge and screw. The bracket is formed with the diametrically opposite openings 15 through which the reduced lower ends of the webs 3 extend into engagement with the inclined walls of the diametrically opposite grooves 16 in the wedge 12. The screw 13 threadedly engages the bracket and is adapted to be rotatably adjusted in the bracket to axially adjust the wedge, thereby spreading the lower ends of the brake shoes apart or allowing them to be moved toward each other. The adjustment device is located completely at the inside of the backing plate which is formed with the boss 17 providing a pocket for freely receiving the adjacent end of the bracket. The size of the boss is sufficient to permit the adjustment device to move freely circumferentially and radially with the lower ends of the brake shoes when the brake is applied. The bottom of the boss is formed with the opening 18 through which a suitable tool may be inserted into the polygonal recess 19 in the screw 13 to adjust the latter. The hole 18 is normally closed by the spring plate 20 which is pivotally secured to the backing plate.

The screw is held in its adjusted positions by means of the spring detent 21 which extends longitudinally within the diametrically extending groove 22 in the end of the wedge adjacent the screw. The middle of the detent is pivotally secured to the wedge by suitable means such as a headed pin and the ends of the detent are adapted to ride over an annular series of radial notches in the adjacent end of the screw.

The upper ends of the brake shoes are adapted to be spread apart and into engagement with the brake flange of the brake drum by means of a hydraulic actuator which, as shown, comprises the wheel cylinder 23 which has the cylinder 24 secured to the backing plate 8 and the pistons 25 within the cylinder. 26 are cup-shaped sealing members at the inner ends of the pistons slidably engaging the cylinder and 27 is a compression coil spring between the sealing members resiliently holding the same against the pistons and resiliently urging the pistons outwardly against the upper ends of the webs 3 of the brake shoes.

The wheel cylinder forms an anchor for either of the upper ends of the brake shoes depending on the direction of rotation of the brake drum, the brake friction device formed of the brake shoes being of the floating type and being adapted to anchor at either end. To avoid deforming the anchoring portions of either the wheel cylinder or the brake shoes, the wheel cylinder is provided at its ends with the abutments 28 and the ends of the webs 3 of the brake shoes are provided with the upset shoulder portions 29. The abutment 28 is a wear ring telescoped or sleeved over the adjacent end of the cylinder and abutting both the extreme end and the annular shoulder 30 formed on the cylinder. Each wear ring has at its outer end the diametrically opposite arcuate inner bearing surfaces 31 having the same radius of curvature from the same center in the axis of the wheel cylinder. These bearing surfaces form the bottoms of grooves in the outer end of each wear ring which are in the same plane as the web of the associated brake shoe. The upset portions 29 extend transversely from opposite sides of each brake shoe web and are arcuate from their upper to their lower ends and form bearing portions having the same radius of curvature and center as the bearing surfaces 31. The bearing portions are adapted to slidably engage the sides of the grooves and abut the bearing surfaces formed by the bottoms of the grooves. It will thus be seen that the wear rings, in addition to serving as anchors for the brake shoes, laterally position the upper ends of the brake shoes relative to the backing plate and, furthermore, serve to position the upper ends of the brake shoes radially with respect to the axis of the backing plate.

32 is a tension coil spring between the brake shoes near their lower ends for resiliently holding the lower ends against the wedge of the adjustment device 11. 33 and 34 are tension coil springs connected to the webs of the brake shoes 1 and 2, respectively, preferably slightly above the resilient devices 10 and also connected to the pin 35 radially inside the wheel cylinder midway of its ends. The pin has an inner enlarged portion abutting the backing plate and a reduced portion extending through the backing plate and adjacent reinforcing plate and riveted over the latter. The coil springs 33 and 34 by reason of their inclination serve, in addition to resiliently urging the upper ends of the brake shoes against the wear rings, to resiliently urge the brake friction device including the brake shoes in a generally radially outward direction relative to the wheel cylinder. The strength of the coil springs 33 and 34 is such that as the pistons of the wheel cylinder are being forced outwardly to spread the upper ends of the shoes apart, the bearing portions 29 at the upper ends of the shoe webs slidably move over the radially outer bearing surfaces 31 in a generally radially outward direction until the upper ends of the linings engage the brake flange of the brake drum. Then, depending upon the direction of rotation of the brake drum, the bearing portion 29 of the leading brake shoe will leave the bearing surface 31 and the leading brake shoe will wrap into full engagement with the brake flange and then through the adjustment device 11 cause the trailing brake shoe to wrap into full engagement with the brake flange, after which the bearing portion 29 of the trailing brake shoe slides back over the bearing surface 31 into its normal anchored position. It will thus be seen that with this arrangement while both upper ends of the brake friction device may temporarily move from their anchored positions, they remain in contact with the anchoring portions of the anchor until the primary shoe begins to wrap into contact with the brake flange. As a result "clunking," or other objectionable noise owing to application, is avoided.

Figures 6 and 7 illustrate another embodiment of my invention in which the floating friction device comprises the shoes 36 and 37 operatively connected at their lower ends by the adjustment device 38. The latter is constructed in the same manner as the adjustment device 11, but the upper ends of the webs of the brake shoes 36 and 37 are provided with the extensions 39 beyond the upset arcuate portions 40. These upset arcuate portions are formed in the same manner as the upset portions 29 and engage the wear rings 41 upon the ends of the cylinder 42, both the wear rings and the cylinder being the same as the wear rings 28 and the cylinder 24. The extensions 39 are engageable with the outer faces of the heads 43 of the cup-shaped pistons, the side walls or flanges of which are provided with the generally semi-cylindrical rubber sealing rings 44 slidably engaging the wall of the cylinder. 45 and 46 are tension coil springs connected at one end to the webs of the brake shoes 36 and 37 midway of their ends and at the other end to the pins 47 secured to the backing plate 48. The pins are located above the line connecting the midpoints of the brake shoe webs and the coil springs are inclined from the brake shoe webs toward the backing plate. As a result of this construction, the coil springs serve to hold the axial flanges of the brake shoes against the lands upon the backing plate; serve to hold the lower ends of the brake shoe webs in contact with the wedge of the adjusting device; serve to hold the bearing portions at the upper ends of the brake shoe webs anchored against the wear rings of the wheel cylinder; and also serve to resiliently bodily urge the brake friction device in a generally radially outward direction toward the wheel cylinder. As a result, this brake operates in the same manner as the brake of Figures 1 to 5 inclusive, and is also quiet in operation.

In the modifications illustrated in Figures 1 to 5 inclusive, and Figures 6 and 7, the cylinders are sealed at their ends to prevent entrance of moisture, dust, and other foreign elements by flexible boots or sealing elements 49 and 50, respectively. In each case the boot or sealing element is preferably formed of rubber and has beads at its opposite ends closely encircling the associated wear ring and brake shoe web beyond its upset portion. Both the wear ring and brake shoe web are preferably grooved to receive the beads.

Figure 8:
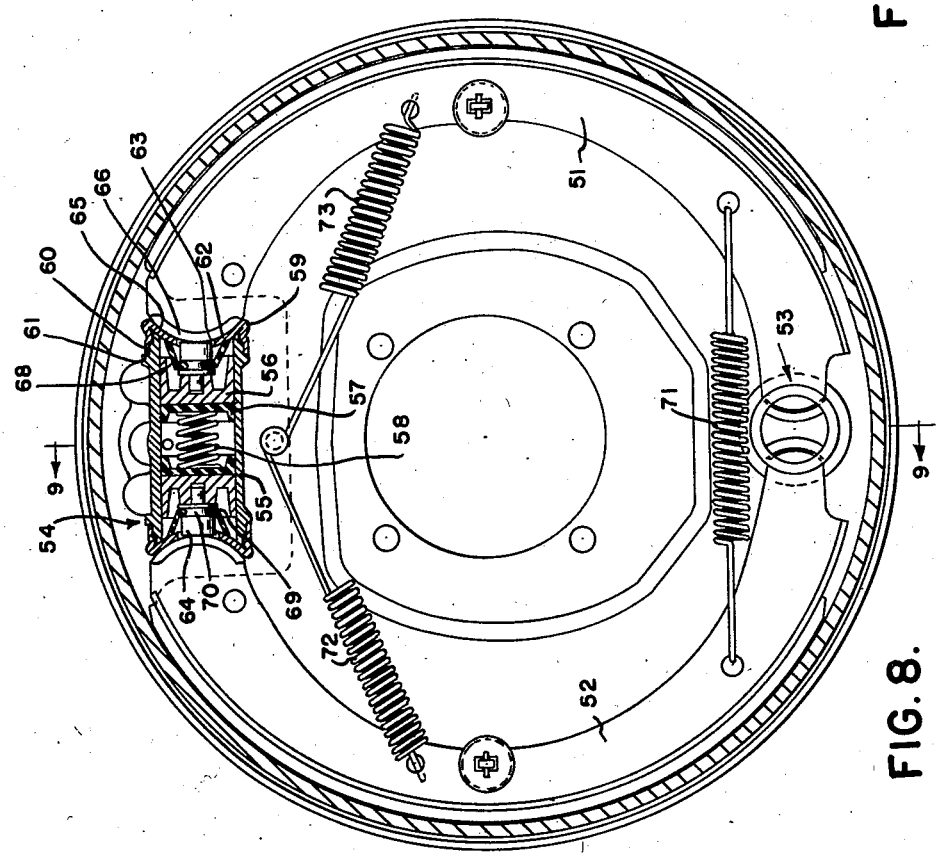
Figure 8 is a view similar to Figure 1 showing another embodiment of my invention.

Figures 8 and 9 illustrate another embodiment of my invention in which the floating friction device comprises the shoes 51 and 52 operatively connected at their lower ends by the adjustment device 53. Both the shoes and adjustment device are formed in the same manner as the shoes 1 and 2 and the adjustment device 11 of Figures 1 to 5, inclusive. 54 is the hydraulic actuator between the upper ends of the shoes comprising the cylinder 55 secured to the backing plate and the pistons 56 reciprocable within the cylinder. Cup-shaped sealing members 57 are provided at the inner ends of the pistons and a compression coil spring 58 between the sealing members serves to resiliently hold the sealing members against the pistons and to resiliently urge the pistons outwardly toward the upper ends of the shoes. The cylinder is provided at its open ends with the abutments 59 for engaging the upper ends of the shoes and limiting their movement toward each other. Each abutment is in the nature of a sheet metal wear ring having an annular portion 60 encircling the adjacent end of the cylinder and abutting the annular shoulder 61 formed on the cylinder and also having the web portion 62 abutting the end of the cylinder and extending partially across the open end of the cylinder. The central portion of the web is formed with the opening 63 through which the plug 64 carried upon the adjacent piston is adapted to extend. The web portion 62 is concave or dished and the bearing surface 65 formed at its outer side forms a part of a spherical surface having its center in the axis of the cylinder. The associated upper end of the brake shoe is formed with the upset portion 66 on the end of the shoe web providing an arcuate bearing portion having the same radius of curvature and center as the bearing surface 65.

To prevent entrance into the cylinder of moisture, dust, and other foreign elements, a flexible boot or sealing element 68 is provided within each end portion of the cylinder. Each boot or sealing element is preferably formed of rubber and is annular and, more particularly, frusto-conical. The inner end of each boot is provided with the bead 69 located in the annular groove 70 formed in the plug 64. The other end of the boot abuts at all times the inner face of the web of the associated abutment.

71, 72 and 73 are coil springs corresponding to the coil springs 32, 33 and 34 of Figures 1 to 5, inclusive, and functioning in the same manner.

What I claim as my invention is:

1. In a brake, a brake friction element, a fluid pressure actuator for said element comprising a cylinder and a piston movable within said cylinder and operable on said element, and a wear ring engaging said cylinder and having a concave bearing surface for engagement by said element.

2. In a brake, a brake friction element having an arcuate bearing portion, a fluid pressure actuator for said element comprising a cylinder and a piston movable within said cylinder and operable on said element, and a wear ring telescopically engaging said cylinder and having an arcuate bearing surface for engagement by and constructed to normally position said bearing portion.

3. In a brake, a brake friction element, a fluid pressure actuator for said element comprising a cylinder and a piston movable within said cylinder and operable on said element, and a wear ring sleeved over and abutting said cylinder and having diametrically opposite arcuate inner bearing surfaces for engagement by said element.

4. In a brake, brake friction means comprising a pair of brake shoes, a backing plate, an actuator for said brake shoes located on said backing plate between adjacent ends of said brake shoes, said actuator comprising a housing engageable by said brake shoes when in their inoperative position, pistons movable within said housing and engageable with said brake shoes, an adjustment for said brake shoes located between the other ends thereof and free to move with said brake shoes relative to said backing plate, and a single spring between each of said brake shoes and said backing plate for normally holding said brake shoes against said backing plate and in inoperative position.

5. In a brake, brake friction means comprising a pair of brake shoes having upset arcuate shoulders on adjacent ends, an actuator for said brake shoes comprising a stationary housing having arcuate bearing surfaces engageable by said arcuate shoulders of said brake shoes, an adjustment for said brake shoes located between the other ends thereof and free to move therewith, and a single retracting spring for each of said brake shoes for urging said arcuate shoulders toward said arcuate bearing surfaces in both lateral and radial directions.

6. In a brake, a brake shoe, an actuator for said brake shoe comprising a housing and a member movable within said housing and operable on said brake shoe, said brake shoe having an upset shoulder for abutting said housing and an extension within said housing engageable with said member.

7. In a brake, a brake friction element, an actuator for said element comprising a cylinder and a member movable within said cylinder and operable on said element, and a wear ring on said cylinder having a web portion provided with a concave part for abutting said element.

8. In a brake, a brake friction element, a fluid pressure actuator for said element comprising a cylinder and a piston movable within said cylinder and operable on said element, and a wear ring telescopically engaging said cylinder and having a concave web portion for engagement by said element.

9. In a brake, a brake friction element, an actuator for said element comprising a housing element, a member movable within said housing element operable on said friction element, and an abutment on said housing element engageable with said friction element, and an annular sealing element within said housing element between said member and abutment.

10. In a brake, a brake friction element, a housing element having an opening, an abutment for said friction element on said housing element and extending partially across said opening, a reciprocable member within said housing element, means extending through said abutment for operatively connecting said reciprocable member to said friction element, and an annular sealing element within said housing element between said means and abutment.

11. In a brake, a brake friction element, an actuator for said element comprising a housing element having an opening and a member movable within said housing element operatively connected to said friction element, an abutment for said friction element having a web extending partially across said opening and through which the operative connection extends, and a flexible annular sealing element within said housing element having one end movable with said member and the other end abutting said web.

CHARLES W. SINCLAIR.